US011119724B2

(12) United States Patent
O'Donnell et al.

(10) Patent No.: US 11,119,724 B2
(45) Date of Patent: Sep. 14, 2021

(54) STANDALONE DISK JOCKEY CONSOLE APPARATUS

(71) Applicant: inMusic Brands, Inc., Cumberland, RI (US)

(72) Inventors: John O'Donnell, Fort Lauderdale, FL (US); John Souppa, Ashland, MA (US); Ross Hartley Goodwin, Riverside, RI (US); Christopher Blane Roman, Wrentham, MA (US); Jason William Stout, Warwick, RI (US)

(73) Assignee: INMUSIC BRANDS, INC., Cumberland, RI (US)

( * ) Notice: Subject to any disclaimer, the term of this patent is extended or adjusted under 35 U.S.C. 154(b) by 0 days.

(21) Appl. No.: 16/712,404

(22) Filed: Dec. 12, 2019

(65) Prior Publication Data

US 2020/0334001 A1 Oct. 22, 2020

Related U.S. Application Data

(60) Provisional application No. 62/778,687, filed on Dec. 12, 2018.

(51) Int. Cl.
*G06F 3/16* (2006.01)
*H04H 60/04* (2008.01)
*H04S 7/00* (2006.01)

(52) U.S. Cl.
CPC ............ *G06F 3/165* (2013.01); *H04H 60/04* (2013.01); *H04S 7/00* (2013.01); *G10H 2240/325* (2013.01)

(58) Field of Classification Search
CPC ....... G10H 2210/241; G10H 2220/116; G10H 2240/325; G11B 27/038; H04R 3/12; H04R 2227/005; H04R 27/00; H04R 29/008; G06F 3/165; G06F 2240/325
See application file for complete search history.

(56) References Cited

U.S. PATENT DOCUMENTS

| 9,398,372 B2 * | 7/2016 | Mashita | H04R 3/04 |
| 2007/0280489 A1 * | 12/2007 | Roman | H04H 60/04 |
| | | | 381/119 |
| 2013/0343567 A1 * | 12/2013 | Triplett | G06F 16/68 |
| | | | 381/77 |
| 2014/0281984 A1 * | 9/2014 | Milne | G06T 11/206 |
| | | | 715/716 |

* cited by examiner

*Primary Examiner* — Kile O Blair
(74) *Attorney, Agent, or Firm* — Burns & Levinson LLP (57) ABSTRACT

A standalone DJ console includes onboard audio data, user interface, processing engine and mixing module that enable multiple virtual audio players operating under the control of the processor to be mixed by virtual mixing processes into two different audio signal streams routable to different outputs of the console to provide two different audio streams to two separate spaces. The user interface is designed with a virtual display and parallel sets of controls which enable virtual representations of audio waveforms to be scrolled relative to an axis of time above the respective set of controllers used to manipulate the audio signal stream.

15 Claims, 11 Drawing Sheets

STANDALONE DISK JOCKEY CONSOLE APPARATUS

FIELD OF THE INVENTION

The disclosure relates to audio equipment, and, more particularly, to standalone disk jockey ("DJ") console.

BACKGROUND OF THE INVENTION

DJ consoles are used by DJs to manipulate and play audio tracks ("tracks") from one or more digital or analog sources and allow a DJ to manipulate the playback using onboard controllers including buttons, jog wheels, platters, knobs, faders, and/or other controls. The console may be connected to an external sound system that plays an outputted audio signal from the console to the DJ's audience. DJs may use the DJ consoles to, for example, set cue points (i.e., positions within a track from which playback may be initiated), loops (i.e., portions of a track that may be repeated as many times as the DJ desires), apply sound effects to tracks, change a track's tempo, and/or play a first track to the DJ's audience. DJ consoles allow a DJ to seamlessly switch from playing one track to the audience to playing another track to the audience (i.e., switch tracks without an audible gap, or abrupt change in beat or rhythm).

Standalone DJ consoles typically include both main audio outputs as well as booth audio outputs to which the same audio signal stream is routed. This configuration allows local speakers in the DJ booth to play the same audio signal stream as that being sent through the main audio outputs of the console and into the main room. As DJ entertainers have become more popular and venues have increased in size, multiple spaces are sometimes involved, with the need for separate sets of music to be played in separate rooms within a venue.

Accordingly, a need exists for a standalone DJ console which is capable of mixing multiple separate audio program channels into two different audio signal streams routable to different outputs of the console to provide two different audio streams to two separate spaces.

Further need exists for the ability to visually coordinate a virtual representation of a currently playing audio stream with the controls used to manipulate such stream.

SUMMARY OF THE INVENTION

Disclosed is a standalone DJ console includes onboard audio data, user interface, processing engine and mixing module that enable multiple virtual audio players operating under the control of the processor to be mixed by virtual mixing processes into two different audio signal streams routable to different outputs of the console to provide two different audio streams to two separate spaces. The user interface is designed with a virtual display and parallel sets of controls which enable virtual representations of audio waveforms to be scrolled relative to an axis of time above the respective set of controllers used to manipulate the audio signal stream.

According to one aspect of the disclosure, a standalone disk jockey console apparatus comprises: a plurality of pairs of audio outputs; a user interface comprising a plurality of controllers; and a processor operatively coupled to the user interface and having an operational mode configured to: execute a plurality of virtual player processes, each virtual player process capable of generating an audio program, and execute a plurality of virtual mixer processes, each virtual mixer processes capable of converting audio programs associated with at least one of the plurality of virtual player processes into an audio signal stream, wherein each virtual mixer processes is further capable of routing its respective audio signal stream to a selected pair of audio outputs in accordance with a configuration of the plurality of controllers of the user interface, the selected pair of audio outputs being different than another pair of audio outputs to which another audio signal stream is simultaneously routed.

According to another aspect of the disclosure, a standalone disk jockey console apparatus comprises: primary and secondary audio outputs; a user interface comprising a plurality of controllers; a processor operatively coupled to the user interface and having an operational mode configured to: execute first and second virtual player processes each of which is capable of generating a first and a second audio program, respectively, and execute first and second virtual mixer processes each of which is capable of converting the first and second audio programs, respectively, into first and second audio signal streams, respectively, the first audio signal stream being different from the second audio signal stream, wherein the first virtual mixer processes is further capable of routing the first audio signal stream to one of the primary and secondary audio outputs in accordance with a configuration of the plurality of controllers of the user interface, and wherein the second virtual mixer processes is further capable of simultaneously routing the second audio signal stream to the other of the primary and secondary audio outputs in accordance with the configuration of the plurality of controllers of the user interface.

According to yet another aspect of the disclosure, a method for generating multiple audio streams with a standalone disk jockey console comprises: A) accessing a source of audio data; B) generating, with a first virtual player process executing under control of the standalone disk jockey console, a first audio program from the source of audio data; C) generating, with a second virtual player process executing under control of the standalone disk jockey console, a second audio program different from the first audio program; D) converting, under control of the standalone disk jockey console, the first and second audio programs into first and second audio signal streams, respectively, and E) routing, under control of the standalone disk jockey console, the first audio signal stream to a primary audio output of the console and simultaneously routing the second audio signal stream to a secondary audio output of the console. In one embodiment, the further comprises: F) displaying a virtual representation of one of the first and second audio signal streams oriented relative to an axis representing time.

According to yet another aspect of the disclosure, a standalone disk jockey console apparatus comprises: a user interface comprising a display and a plurality of set of controllers, each set of controllers arranged linearly along an axis and capable for manipulating an audio signal stream; wherein the display has an operational mode for presenting a virtual waveform representation of an audio stream, wherein the virtual waveform representation is oriented relative to an axis representing time and such axis representing time is oriented parallel to the axis of the respective set of controllers by which the audio signal stream is manipulated. In embodiments, the virtual waveform representation is presented on the display so that axis representing time is collinear with the axis of the respective set of controllers by which the audio signal stream is manipulatable. In embodiments, the display has an operational mode for presenting multiple virtual waveform representations of multiple respective audio streams, wherein each virtual waveform representation is oriented relative to an axis representing time and each axis representing time is collinear with the axis of the respective set of controllers by which the audio signal stream is manipulatable.

DESCRIPTION OF THE FIGURES

Reference will now be made to certain embodiments consistent with the present disclosure, examples of which are illustrated in the accompanying drawings, in which.

DETAILED DESCRIPTION

The present disclosure will be more completely understood through the following description, which should be read in conjunction with the drawings. In this description, like numbers refer to similar elements within various embodiments of the present disclosure. The skilled artisan will readily appreciate that the methods, apparatus and systems described herein are merely exemplary and that variations can be made without departing from the spirit and scope of the disclosure. The terms comprise, include, and/or plural forms of each are open ended and include the listed parts and can include additional parts that are not listed. The term and/or is open ended and includes one or more of the listed parts and combinations of the listed parts.

FIGS. 1-5, inter alia, illustrate a standalone disk jockey console device 10 capable of implementing the methods and techniques described herein. A console device suitable for implementing the subject matter disclosed herein is the Denon Prime 4, commercially available from inMusic Brands, Inc. of Cumberland, R.I., 02864. Console device 10 comprises, memory 12, audio input interface13, a processor/audio engine 14, a user interface 15, an audio output interface 16, network interface 17, and power supply 18. Each of the major components of device 10 described in greater detail herein.

Figure 1:
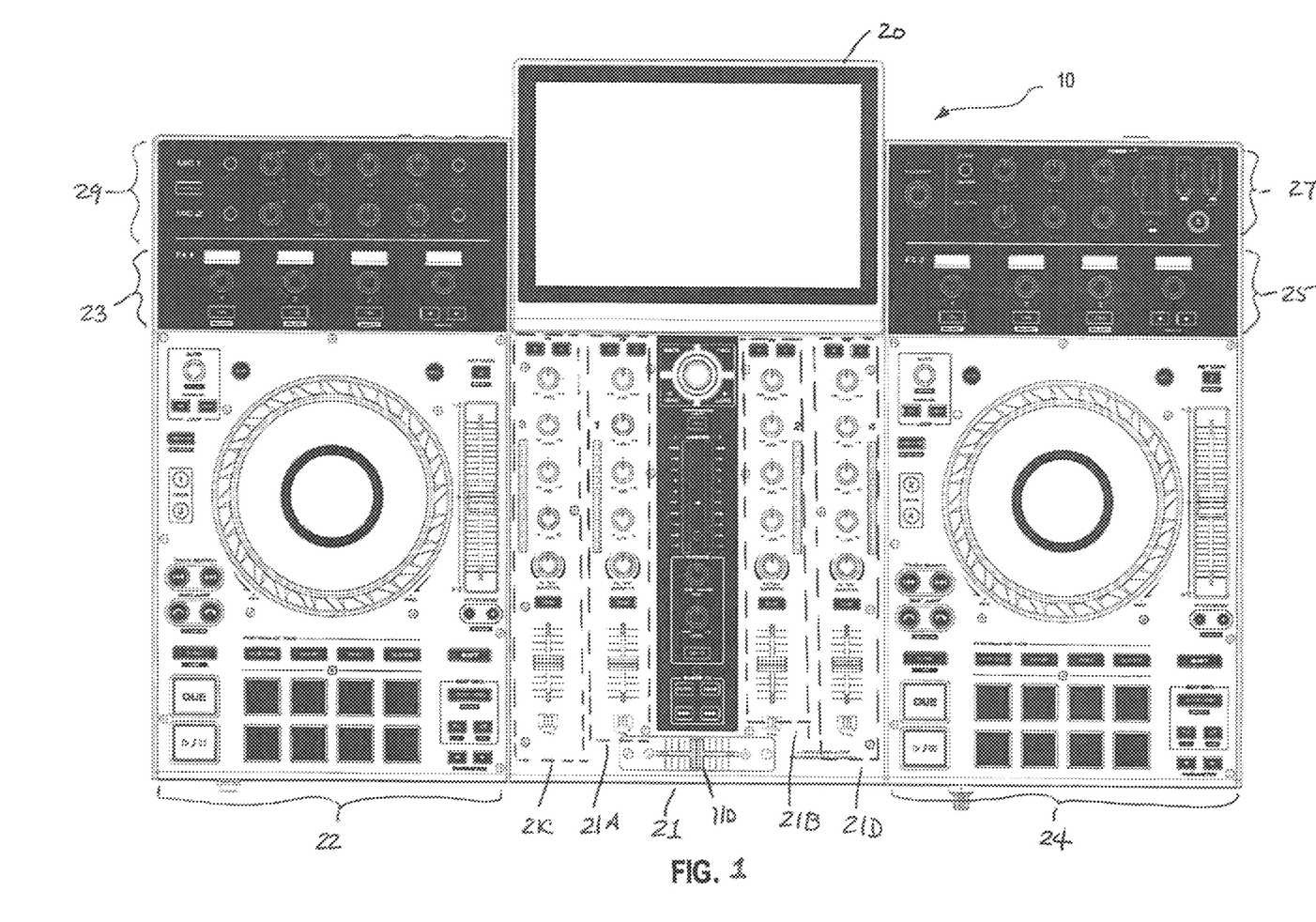
FIG. 1 illustrates conceptually a top plan view of standalone disk jockey console in accordance with the disclosure.
Figure 2:
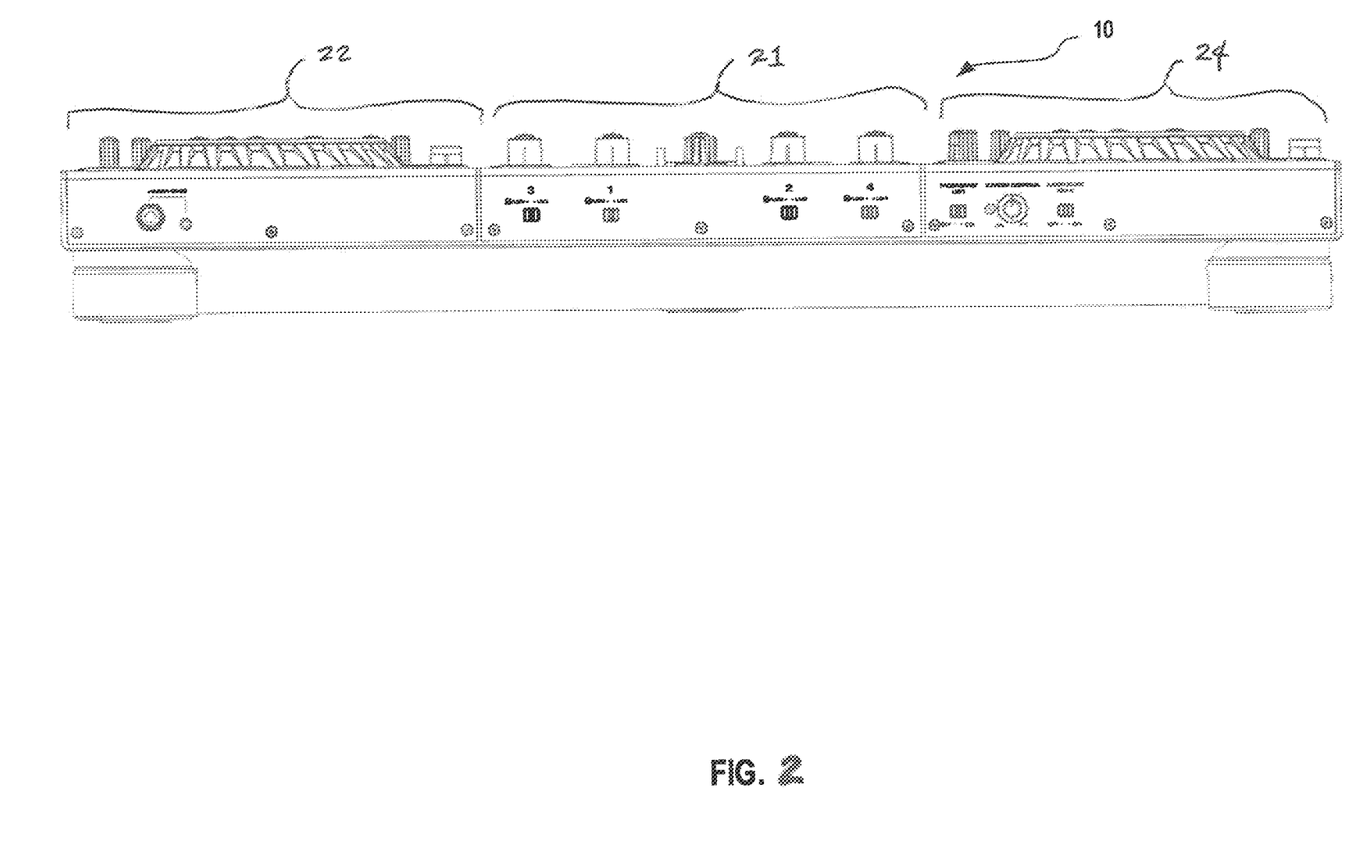
FIG. 2 illustrates conceptually a front plan view of the standalone disk jockey console of FIG. 1 in accordance with the disclosure.

FIGS. 1-4 illustrate various views of the exterior of the console device 10 in accordance with an embodiment of the disclosure. More specifically, FIG. 1 illustrates a front perspective view of an exemplary embodiment of device 10. User interface 15, includes the various dedicated controls, such as potentiometers, encoders, soft switches, a display, etc. capable of interfacing with the internal processing, memory, audio interface and control and logic components of device 10. In embodiments, user interface 15 comprises a display 20, which may be implemented with a full-color LCD display, capable of providing visual information including multiple virtual representations of audio signal streams, virtual controls and status indicators, through a variety iconic, graphic, textual and color-coded elements. Beneath display 20 is the channel control panel 21 having four channel control sets 21A-D comprising of various switches, buttons, knobs and a fader, aligned in a column, that control playback of that particular track associated with a particular channel 1-4. Adjacent each side of channel control panel 21 are decks 22 and 24 and their associated respective controls. Above each deck 22 and 24 are an effect interfaces 23 and 25, respectively. Above effect interface 23 is the audio control panel 29 for microphones one and two which are connectable through the audio interface 16 through the rear panel as explained herein. Above effect interface 25 is the volume control and equalization settings section 27 for the master outputs and booth and zone outputs in addition to indicators indicating whether portable memories are connected to the SD interfaces for ST cards and USB ports.

In embodiments, there are four sets of channel controls in the channel control panel 21, each comprising columns of buttons and knobs for manipulating the playback of up to four tracks, each column extending along an axis, as illustrated. Console device 10 may play four tracks simultaneously, fewer tracks simultaneously, or one track. The playback of the tracks may be controlled by one or more processors and/or digital signal processors (DSPs) in console device 10. The tracks may have their beats synchronized by the one or more processors and/or DSPs. Data associated with one or more tracks may be used to control effects applied to other tracks (e.g., stutter frequency, playback speed). Console device 10 may receive the four tracks from one or more computer-readable media, such as an internal hard drive, a USB Flash drive, external servers connected to console device 10 by cable or wirelessly, and/or an external computer connected to console device 10 by cable or wirelessly. Four faders control the output volume of the four tracks, respectively. Platter B may be used to control a first and second track—conceptually playing on "deck 1" and "deck 3," respectively—while platter C may be used to control a third and fourth track—conceptually playing on "deck 2" and "deck 4," respectively. Deck buttons may be pressed to assign platter B to control the first track, and the other deck button may be pressed to assign platter B to control the second track, as illustrated in FIG. 1. Channel control sets 21A-D arranged in four columns and may be pressed or rotated to control the playback of tracks assigned to deck 1 through 4, respectively. For example, the leftmost channel control set 21C can be used to manipulate playback of a track assigned to deck 3, whereas the rightmost channel control set 21D can be used to manipulate playback of a track assigned to deck 4. Crossfader 110 may be moved to the left of center to decrease the volume of one or more tracks assigned to decks 2 and 4. Crossfader 110 may be moved to the right of center to decrease the volume of one or more tracks assigned to decks 1 and 3.

Figure 3:
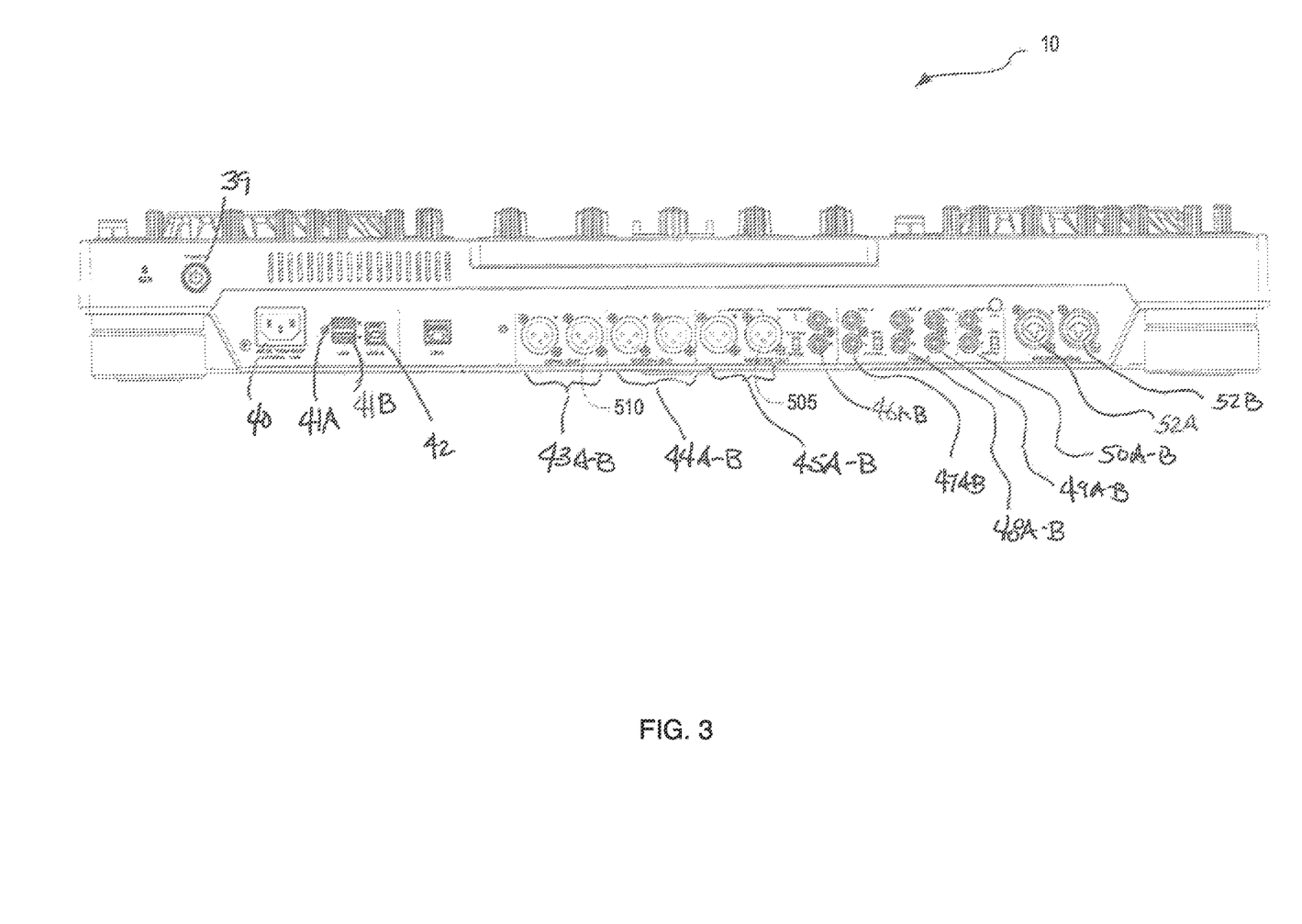
FIG. 3 illustrates conceptually a rear plan view of the standalone disk jockey console of FIG. 1 in accordance with the disclosure.
Figure 4:
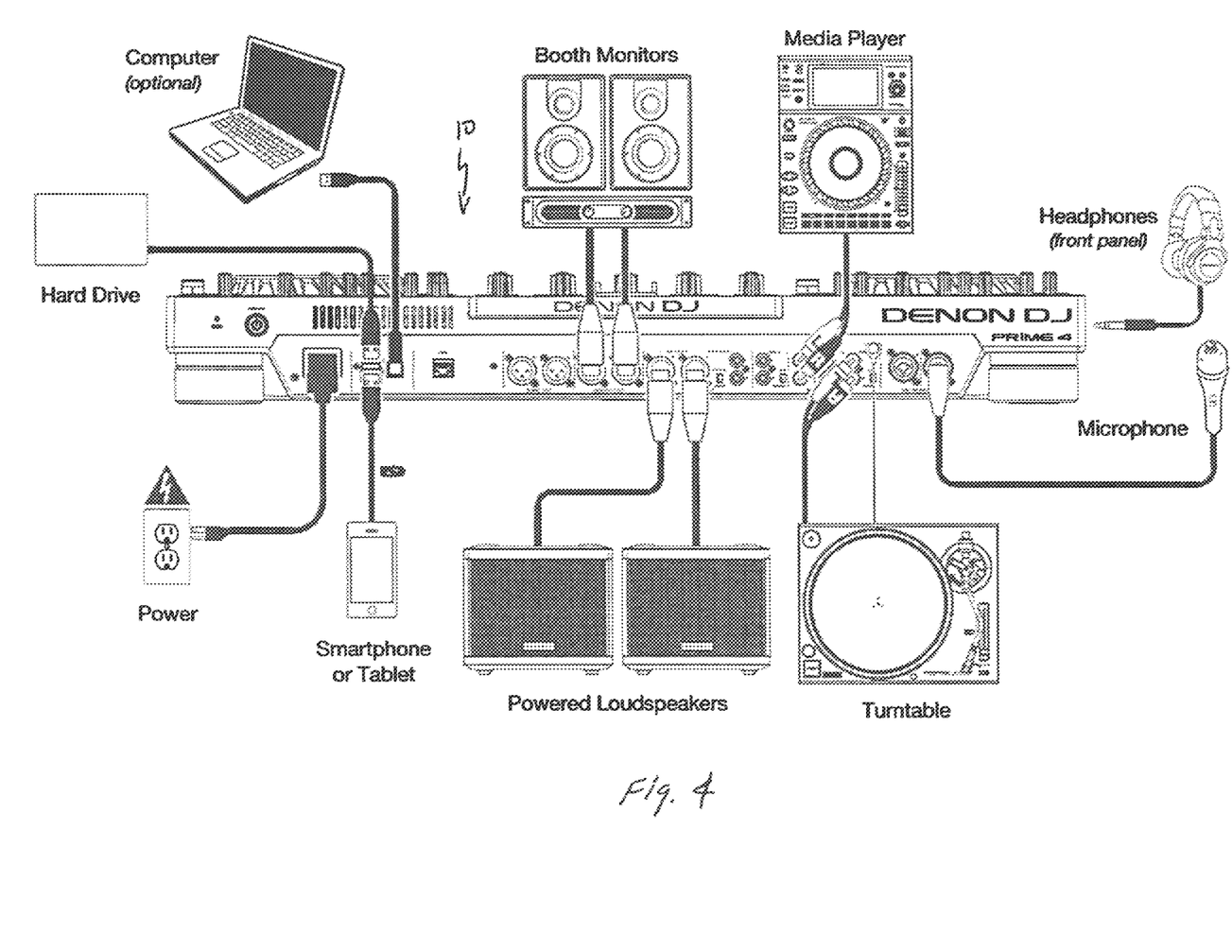
FIG. 4 illustrates conceptually the rear plan view of the standalone disk jockey console of FIG. 2 as connectable to external devices in accordance with the disclosure.

FIGS. 3 and 4 are rear plan views of console device 10, illustrating conceptually the various ports of audio interface 16, as connectable to external devices. More specifically, device 10 is connectable via a standard power socket 40 to a power source in a matter understood the relevant arts. A power switch 39 is provided to power the device 10. A pair of network port 41A-B, implemented as a USB ports, in the rear panel are capable of accepting a USB flash drive or other USB connectable devices such as a smart phone or tablet or portable disk drive, as illustrated in FIG. 3 to facilitate loading and saving of audio data files, to device 10. A USB B port 42, is connectable to the USB port of a laptop computer or other processing device to send and receive audio data to and from a device 10. Three pairs of stereo audio outputs, are provided in the form of XLR male connectors. Zone audio outputs 42A-B, respectively, are provided to connect the device 10 to a pair of booth monitors, as illustrated in FIG. 3. Booth audio outputs 44A-B, respectively, are provided to connect the device 10 to a pair of booth monitors, as illustrated in FIG. 3. Master audio outputs 45A-B, respectively, are provided to connect the device 10 to loudspeakers or an audio amplifier or mixer, etc., as illustrated in FIG. 3. In embodiments, outputs 45A-B may be balanced outputs. A second set of master outputs 46A-B are provided in RCA format and may be an unbalanced output. Master output 505 and zone output 510 may be outputting at +4 dBu and/or −10 dBV operating signal levels. Master output 505 and zone output 510 may be outputting balanced and/or unbalanced signals Audio interface 16 further comprises on the back panel of device 10 four pairs of line inputs 47A-B, 48A-B, 49A-B and 50A-B, each of which may be implemented in RCA format. Inputs 47A-B and 50A-B may be selectable between line and phono to enable connection to a turntable or other meteor playing devices street in FIG. 3. A pair of microphone inputs 52A-B are provided for connecting a microphone into the device 10, as illustrated in FIG. 3. A pair of headphones are connectable through a jack in the front panel of device 10.

Figure 5:
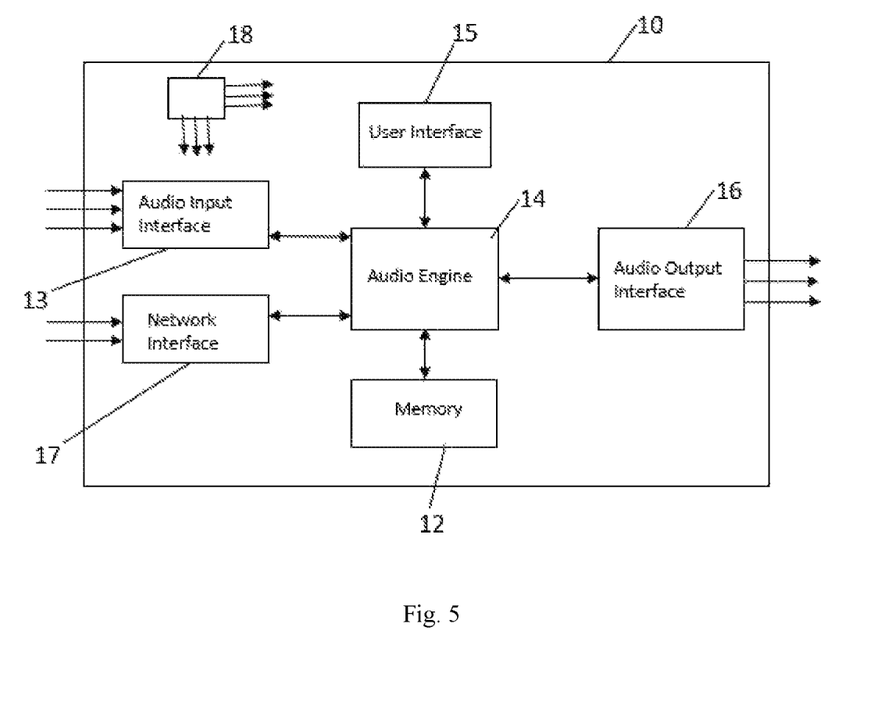
FIG. 5 illustrates conceptually a block diagram of the logical internal organization of the standalone disk jockey console of FIG. 1 in accordance with the disclosure.

FIG. 5 illustrates conceptually a block diagram of the logical internal organization of the standalone disk jockey console of FIG. 1. As noted previously, console device 10 comprises a memory 12, an audio input interface 13, a processor/audio engine 14, a user interface 15, an audio output interface 16, a network interface 17, and power supply 18. In one implementation the processor 14 maybe implement with a special purpose digital signal processing (DSP) chip including any associated RAM, ROM, working registers and other associated memory. Processor/audio engine 14 of device 10 is responsible for instantiating one or more virtual audio player processes used to create an audio program from audio data stored in memory 12 or other memory operatively coupled to processor 14. The outputs of the one or more virtual processors are mixed via one or more virtual mixer processes executing under the control of processor 14 and are capable of routing the mixed audio program to any of the Master buss, booth buss, zone buss, and cue buss in further routing the outputs of the respective buses to any of the Master output, booth output, zone output and headphone output as selected by controls or switches on the user interface for conversion to audio signals. One or more executable code modules storable in rim ROM associated with processor 14 may implement the algorithms necessary to instantiate the virtual player processes and virtual mixer processes described herein as well as to perform the audio signal processing available through the user interface 15 of device 10.

Figure 6:
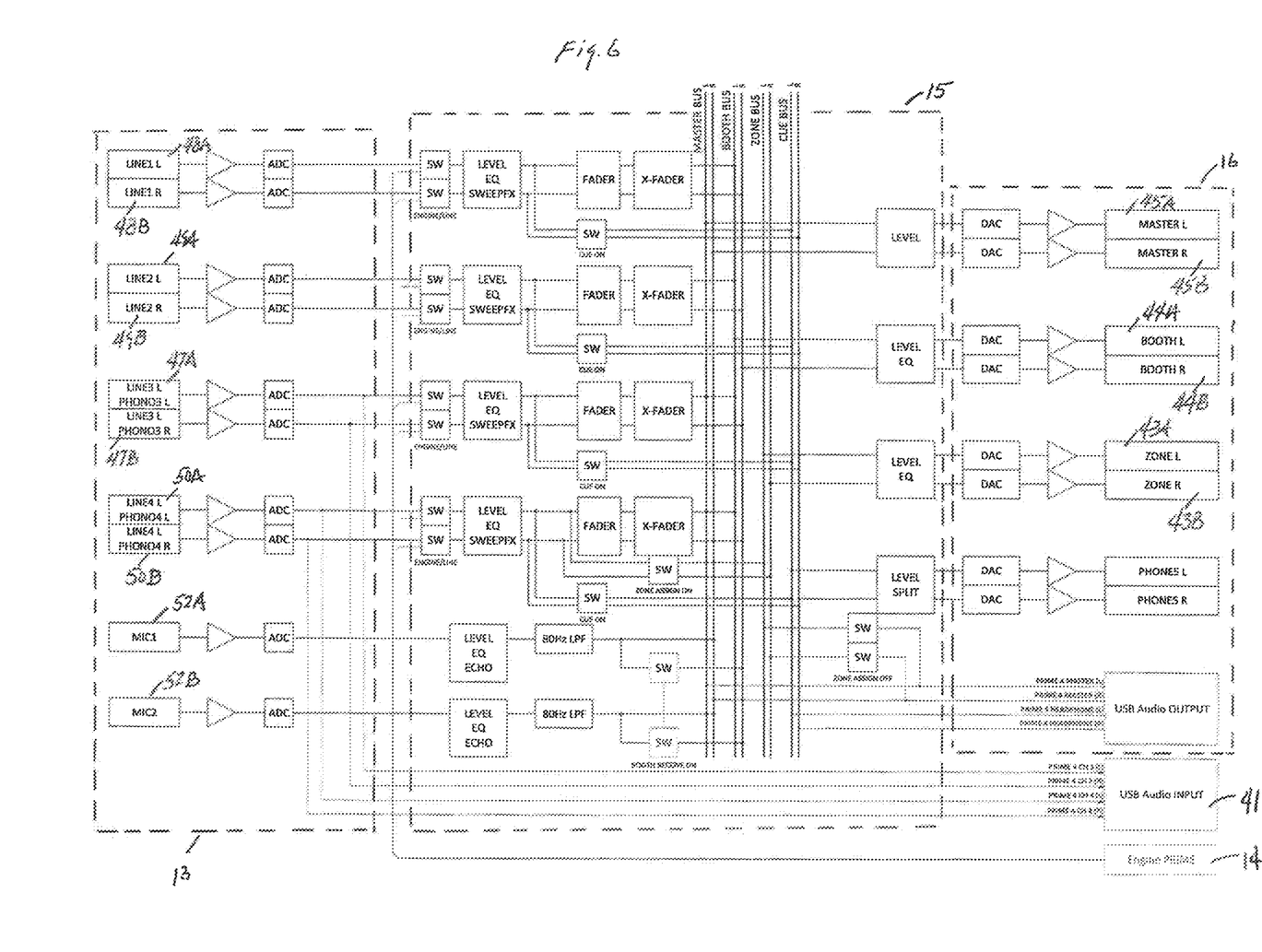
FIG. 6 illustrates schematically the signal flow path architecture of the standalone disk jockey console of FIG. 1 in accordance with the disclosure.

FIG. 6 illustrates schematically the internal signal flow path architecture of console device 10, including components of audio input interface 13, audio output interface 16, user interface 15, and audio engine 14. More specifically, each of line inputs 47A-B, 48A-B, and 49A-B are connectable to the master bus and booth bus through a signal path which includes a buffer/amplifier, and analog to digital converter, a level EQ and sweep effect controller a fader and a cross fader. The output of audio engine 14 is selectively introducable into each of Line 1-3 signal paths via a set of switches at an insertion point prior to the level/EQ/sweep effect controller. Similarly, the output of the level/EQ/sweep effect processor is selectively connectable to the queue bus via a cue switch for each of Lines 1-3. The signal path for Line 4, e.g. line inputs 50A-B, is similar to that described with reference to Lines 1-3, except that the output of the level/EQ/sweep effect controller is separately routable to the zone bus via a switch. Each microphone inputs 52 A-B is connectable to the master bus through a signal path which includes an analog to digital converter, a level/EQ/echo processor, and a low-pass filter, both lines also being selectively connectable to the booth bus through a switch. The master bus, booth bus, zone bus and cue bus are connectable to the audio outputs as illustrated in FIG. 6 through a signal path which includes a level/EQ controller, a digital to analog converter, and an amplifier/buffer. In embodiments, any of the master buss, booth buss, zone buss, and cue buss may be implemented physically in hardware or virtually prior to interfacing with audio output interface 16.

Figure 7A:
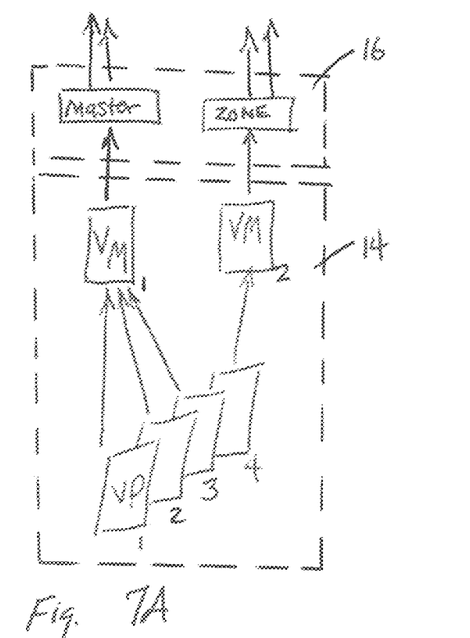
FIG. 7 illustrates conceptually the relationship of virtual processes during operation of the standalone DJ console in accordance with the disclosure
Figure 7B:
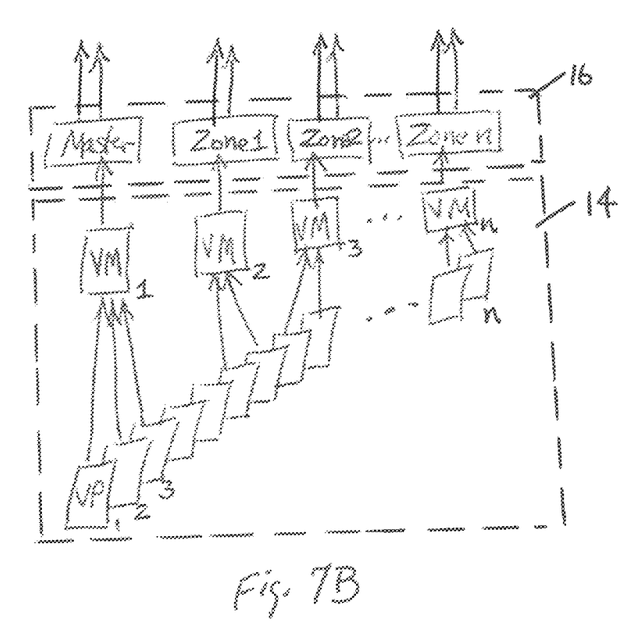
Figure 8A:
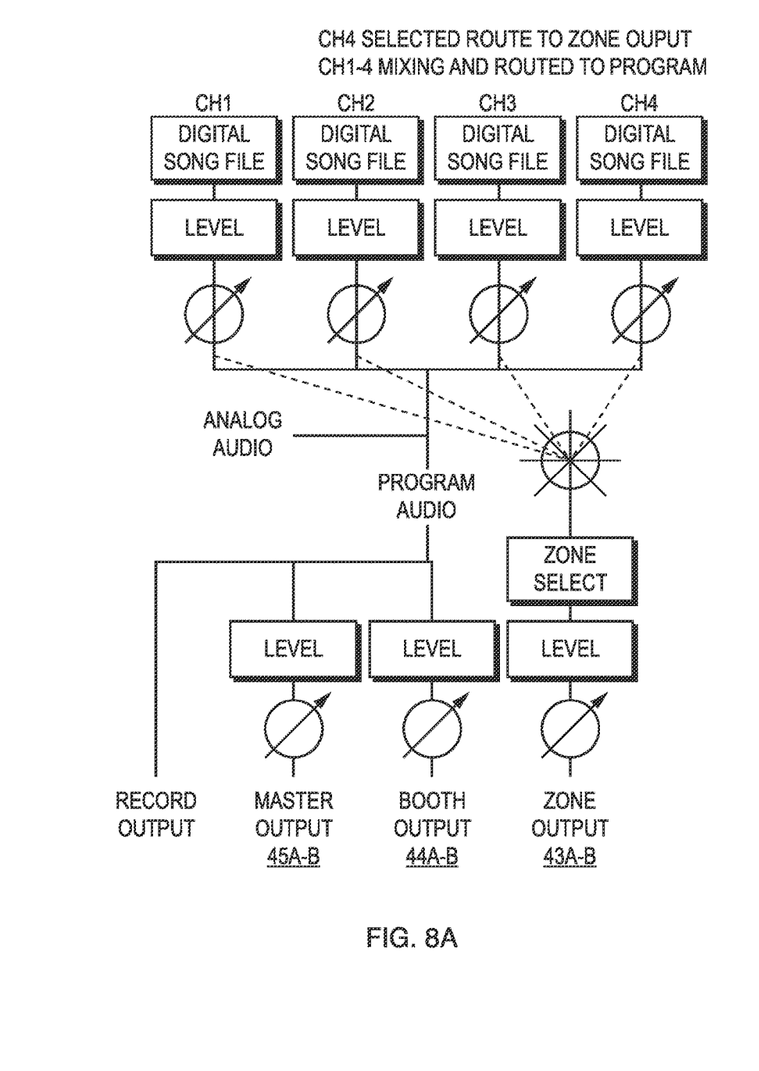
FIG. 8A-B illustrate conceptually the audio routing configurations of a channel to the zone output in accordance with the disclosure.
Figure 8B:
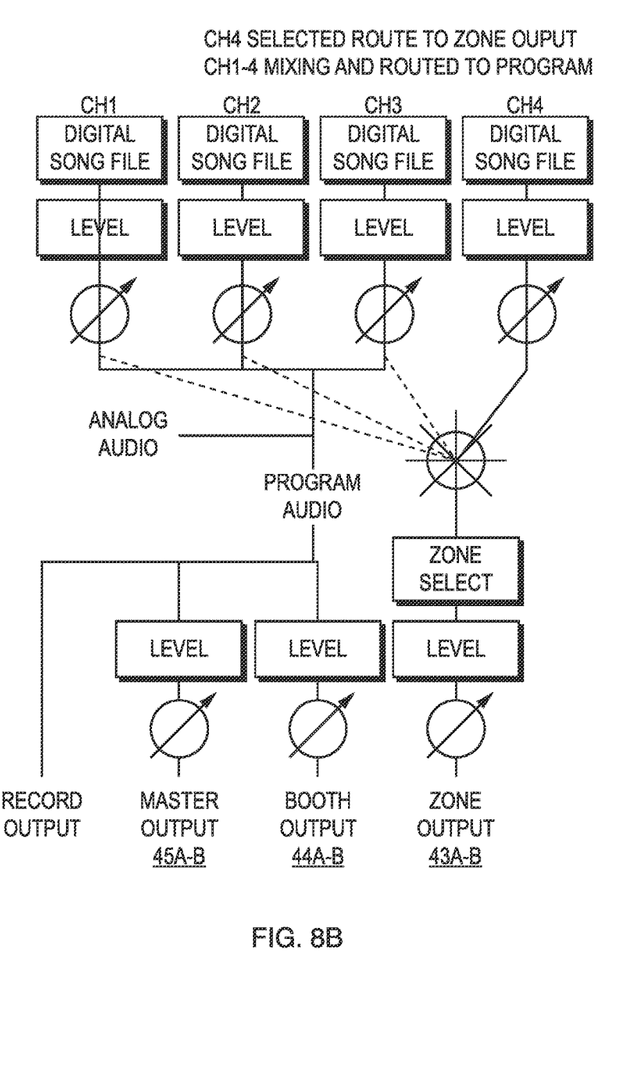
Figure 9A:
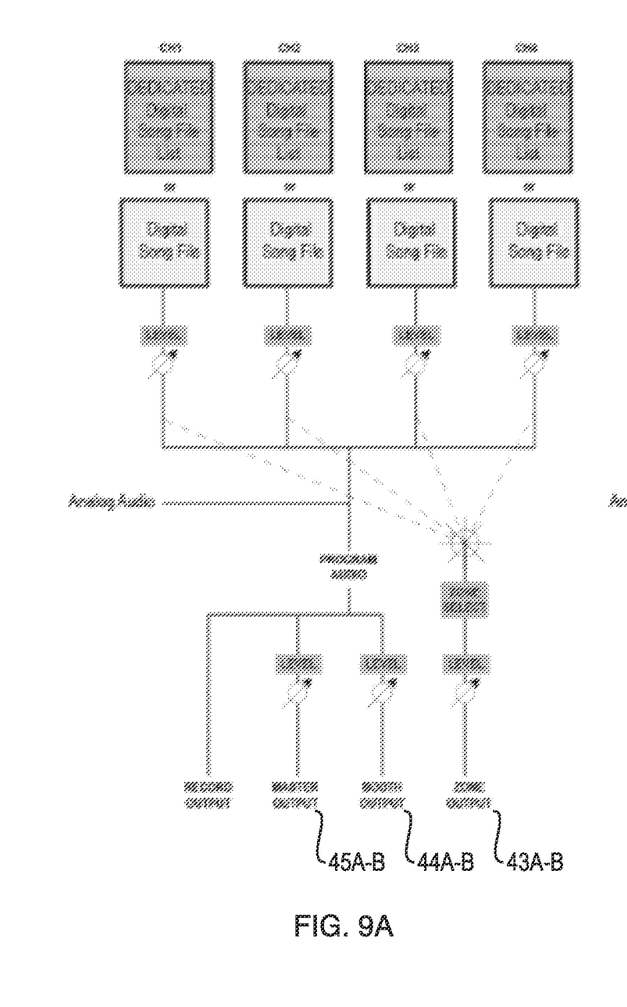
FIG. 9A-B illustrate conceptually the audio routing configurations of a channel to the zone output in accordance with the disclosure.
Figure 9B:
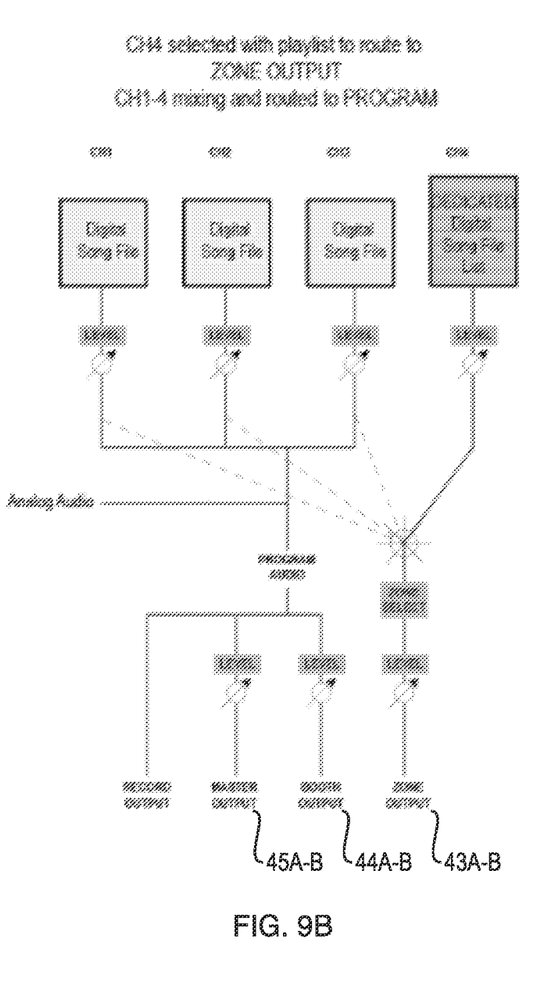

FIG. 7A illustrates a configuration similar to that described with reference to device 10 in which four virtual player processes VP1-4, one for each of channels 1 through 1 of device 10 are mixed via first and second virtual mixing processes VM1-2 with the output channels 1 through 3 being routed via the first virtual mixing process to the Master output and the output of virtual mixing process associated with channel 4 being routed to the zone output, as further illustrated in FIG. 8A-B and 9A-B. In embodiments, the number of virtual player processes and virtual mixing processes is limited only by the processing power within the console device 10 and the amount of available memory is a source of audio data. Similarly, a plurality of zone outputs separate from the master output may be included with console device. FIG. 7B illustrates a configuration in which a plurality of virtual processes VP1-*n* are mixed via a plurality of virtual mixing processes VM1-*n* to multiple outputs of the console including a master output in a plurality of zone outputs, Zone1-*n*. In such configuration, the audio signal streams provided to each of the zone and master outputs may be different from each other.

FIGS. 8A-B and 9A-B illustrates exemplary signal-routing options in device 10. In some embodiments, device 10 may output multiple mixes of tracks to external sound systems. For example, a mix of tracks playing on decks 1 through 3 may be outputted through a main output and a mix containing only a track playing on deck 4 may be outputted through an auxiliary "zone output." In some embodiments, the mix routed to the zone output may contain both a track playing on deck 4 and one or more tracks selected from decks 1 through 3.

Different track playlists ("playlists") may be associated with one or more decks. For example, a first playlist may be associated with decks 1 through 3, allowing user to select tracks from the playlist to play on decks 1 through 3. In this example, a second playlist may be associated with deck 4, such that songs from the second playlist are assigned to deck 4. This may allow a user to let the second playlist run automatically on deck 4 and play through the zone output while focusing the user's attention on the mix created with tracks playing on decks 1 through 3 and outputted through the main output. In embodiments, at least one deck may have its own playlist associated with it. In embodiments, an automated crossfade may be generated between songs playing consecutively on a playlist. In some embodiments, decks 1 through 4 may have four tracks or playlists respectively routed to the main output while a fifth track or playlist is routed to the zone output. In some embodiments, a user may select a track or playlist from at least one of decks 1 through 4 to mix with the fifth playlist and route the resulting mix to the zone output. If one playlist is selected from decks 1 through 4, because this playlist may crossfade between two consecutively playing tracks and because a fifth playlist routed to the zone output may crossfade between two consecutively playing tracks, the resulting mix may include four tracks playing simultaneously (i.e., two crossfaded tracks from the selected playlist from decks 1 through 4 and two crossfaded tracks from the fifth playlist). In some embodiments, a user may selectively route a microphone signal or other external source to the zone output instead or in addition to a selected track or playlist. It is to be understood that device 10 may include more than four decks and/or more than one zone output. The tracks and/or playlists playing on any combination of decks may be sourced from a single computer-readable medium or different sources.

In some embodiments, the same audio tracks may be outputted through the main output and the zone output but the tracks may be mixed at different levels (i.e., some tracks may be played louder in a first mix sent to one output than in a second mix sent to the other output). To facilitate this function, in some embodiments four virtual faders may be displayed on touchscreen to allow a user to set a mix for the zone output whereas faders may be used to set a mix for the main output. In some embodiments, a track may be assigned to fifth deck, deck 5, that has no physical controls permanently associated with it. For example, the user may activate a function on device 10 whereby the rightmost column of channel controls are temporarily associated with deck 5 instead of deck 4.

Figure 10:
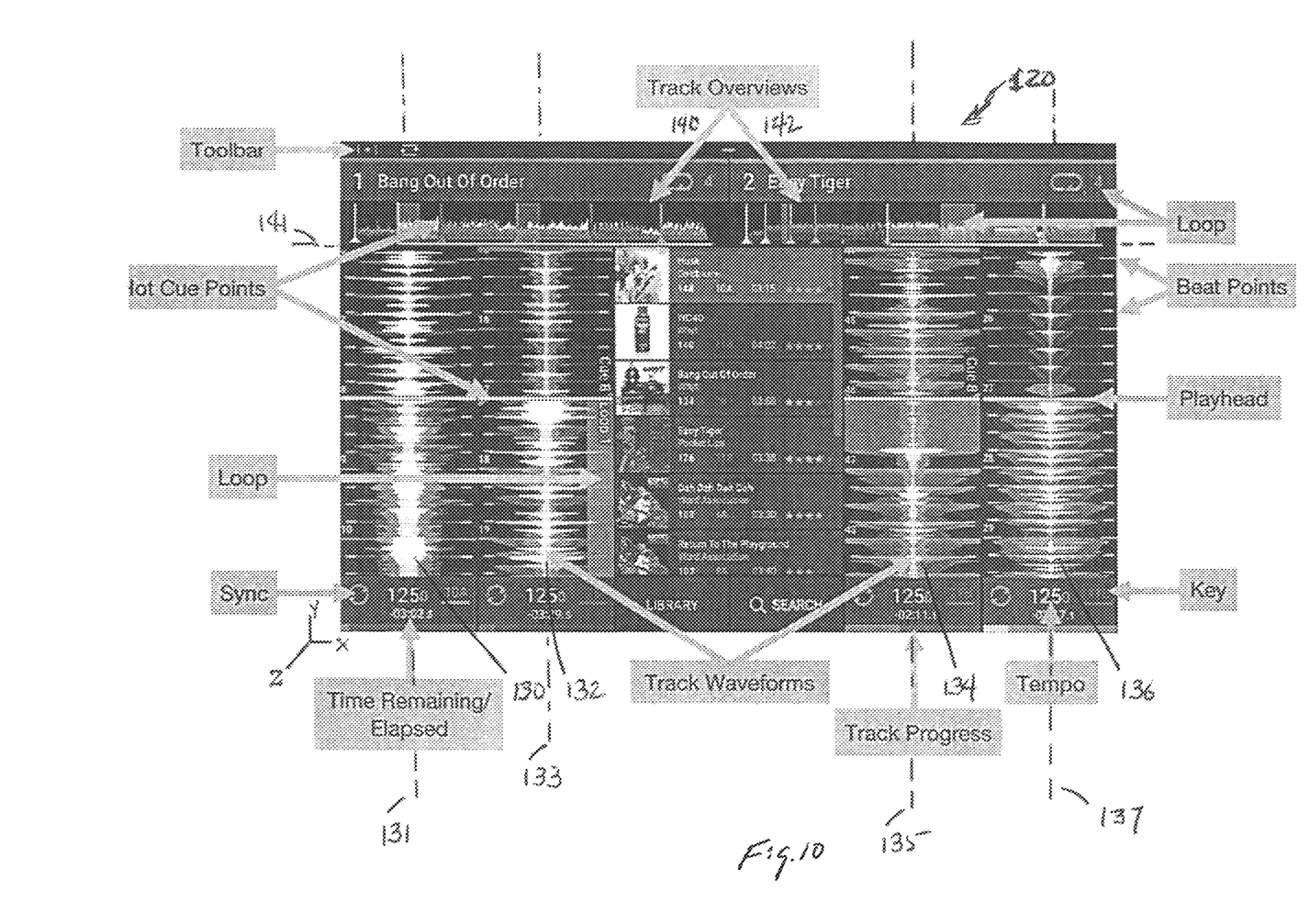
FIG. 10 illustrates conceptually a virtual image on touchscreen display in accordance with the disclosure.

FIG. 10 illustrates a virtual image on touchscreen display 120 showing information relevant to the operation of device 10. Touchscreen 120 may be implemented with a multi-touch display which allows for zooming, scrolling, selecting, in addition to touchscreen functionality. A browse knob may be rotated to navigate through lists (e.g., track lists) and pressed to select an item on touchscreen A (e.g., a track). In FIG. 10, four waveforms 130, 132, 134, and 136, associated with the four tracks, respectively, being played by device 10 are illustrated. The waveforms associated with the tracks currently controlled by the platters may be highlighted and/or the waveforms associated with the tracks currently not controlled by the platters may be dimmed. In embodiments, virtual representation of the waveform audio waveforms 130, 132, 134, and 136 of each audio program are stream of all in real time with their axis of time oriented along either the X or Y axis, relative to a three dimensional XYZ coordinate system. In FIG. 10, the streaming audio waveforms 130, 132, 134, and 136 are oriented stream relative to an axis representing time along the Y axis of the reference coordinate system. Conversely, the displayed waveforms 140 and 141 representing the waveform overview of one of the streaming audio waveforms 130, 132, 134, and 136 are oriented relative to an axis representing time along the X axis of the reference coordinate system. In this manner, an a virtual waveform representing an audio program may be simultaneously presented along two axes representing time, with such axes being either parallel or orthogonal to each other.

Figure 11:
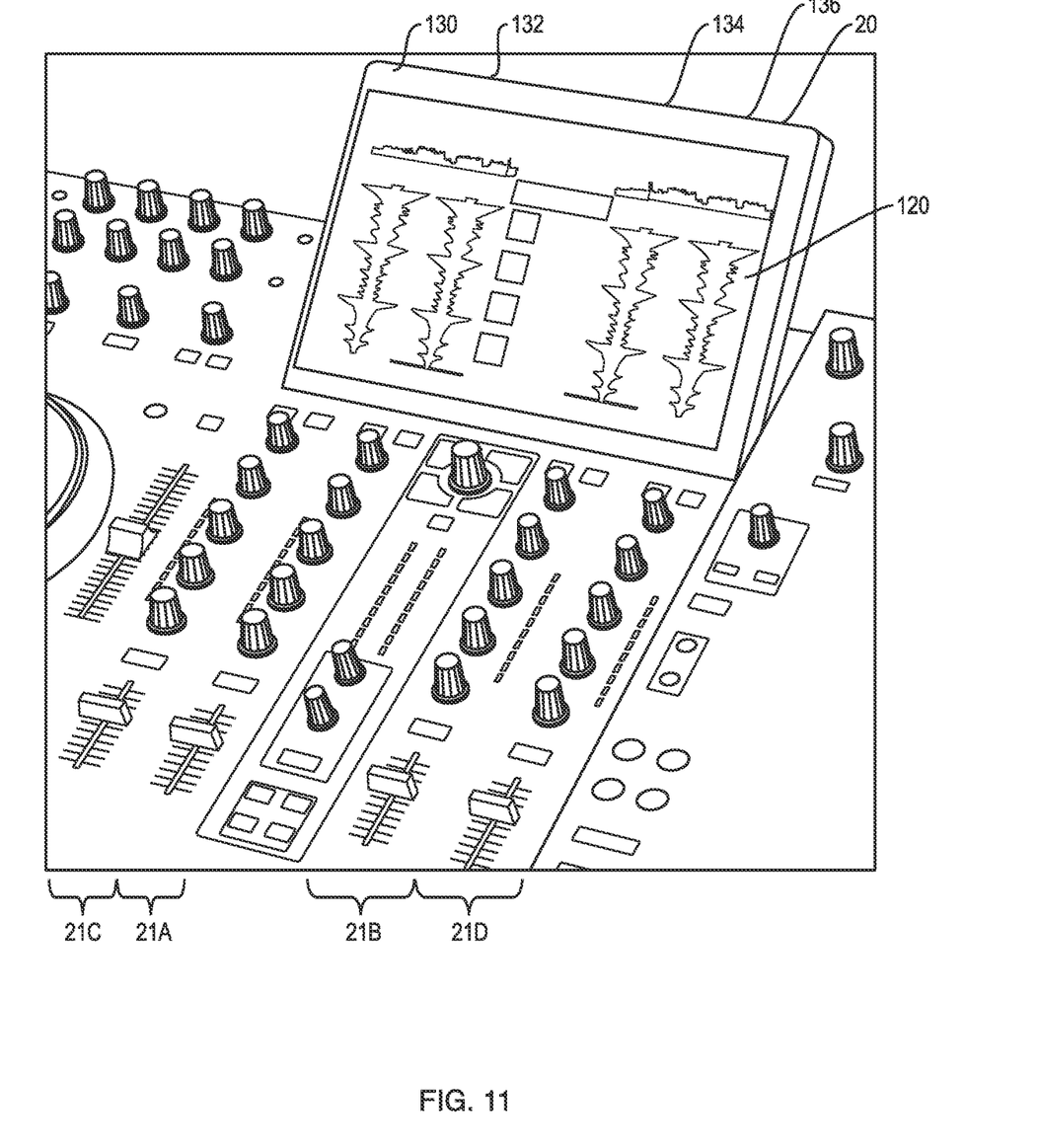
FIG. 11 illustrates conceptually a virtual image on touchscreen display which includes a plurality of waveform representations aligned with sets of associated controls in accordance with the disclosure.

In embodiments, as illustrated in FIG. 11, waveforms 130, 132, 134, and 136 may be displayed vertically, relative to the viewing angle of a user of device 10, and are aligned with the channel control sets 21A-D, shown in FIG. 11. Such configuration facilitates easily identifying which waveform is associated with which track, as the waveform of a particular track is displayed over the column of buttons and knobs that control playback of that particular track. For example, waveform 130 may be associated with a first track that is controlled by the leftmost column of channel controls, whereas waveform 136 may be associated with a second track that is controlled by the rightmost column of channel controls 21D. In some embodiments, one or more waveforms may be replaced with a track list. In some embodiments, album artwork associated with a track may be displayed over the column of buttons and knobs that control playback of that track.

In embodiments, touchscreen 120 may display a playhead over each waveform. The playhead provides a visual indication of the portion of the waveform currently being played on the associated deck. Conceptually, this may be thought of as a representation of a needle position in the groove of a vinyl record or a tape head on a magnetic tape. In some embodiments, a track may be set as a master track and one or more playheads associated with other tracks will flash when one or more other tracks are synchronized with the master track. For example, this may occur when an automatic synchronization feature is engaged.

As illustrated in FIG. 10, various graphic indicators may be utilized to show specific aspects of a track waveform 130, 132, 134, and 136 including, but not limited to, any of hot key points, loop status, synchronization status, time remaining/elapsed, track progress, tempo, playhead position, beat points, etc. In addition to illustrating the track waveforms 130, 132, 134, and 136, one or more track overviews 140 and 142 oriented along an axis of time 141 which is normal to the axis of time 131, 133, 135, and 137 of the track waveforms 130, 132, 134, and 136, respectively, may be illustrated to provide the user with a higher level indication of a position within a track. As such, both a vertically oriented and horizontally oriented virtual image of the same audio track may be simultaneously viewable.

In embodiments, device 10 comprises a wired or wireless network interface 17 for connecting device 10 to the Internet or other network. Such connection may facilitate downloading tracks from a music-streaming service, a server over File Transfer Protocol or other protocol, or a cloud-based storage source. When downloaded, the tracks may be manipulated the same way a track received from an internal or external hard drive or USB flash drive would. Device 10 may generate or read an externally generated database that associates tracks, including tracks downloaded from music-streaming services, with user-generated track data. Track data may comprise, for example, cue points, loop points, tempo, and other information not provided by the track source. In some embodiments, track data may include information provided by the track source. Track data may be associated with the track using a track number or other track identifier provided by the track source.

In some embodiments, power supply 18 may comprise an internal transfer and/or a chargeable battery (e.g., a lithium-ion battery) that can power device 10 when it is not connected to a power source.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents falling within the scope of the disclosure may be resorted to.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A standalone disk jockey console apparatus comprising:
    a housing;
    a plurality of pairs of audio outputs on an exterior surface of the housing;
    a user interface on an exterior surface of the housing and comprising a plurality of controllers; and
    a processor disposed within the housing and operatively coupled to the user interface and having an operational mode configured to:
        simultaneously execute a plurality of virtual player processes, each virtual player process capable of generating an audio program, and
        simultaneously execute a plurality of virtual mixer processes, each virtual mixer process capable of converting audio programs associated with at least one of the plurality of virtual player processes into an audio signal stream,
    wherein each virtual mixer processes is further capable of routing its respective audio signal stream to a selected pair of audio outputs in accordance with a configuration of the plurality of controllers of the user interface, the selected pair of audio outputs being different than another pair of audio outputs to which a different audio signal stream is simultaneously routed, and
    wherein at least two audio programs are generated simultaneously by the processor prior to conversion into different respective audio signal streams prior to simultaneous routing to different of the plurality of pairs of audio outputs.

2. The apparatus of claim 1 further comprising a source of audio data and wherein at least one audio program is generated by a virtual player process from the source of audio data.

3. The apparatus of claim 2 wherein multiple audio programs are generated by virtual player processes from the source of audio data.

4. The apparatus of claim 1 wherein the selected pair of audio outputs are zone audio outputs of the apparatus.

5. The apparatus of claim 4 wherein the another pair of audio outputs are master audio outputs of the apparatus.

6. The apparatus of claim 1 wherein the user interface comprises a display having an operational mode for presenting a virtual waveform representation of one of the audio signal streams.

7. The apparatus of claim 6 wherein the virtual waveform representation of one of the audio signal streams may be oriented along a y-axis or an x-axis representing time.

8. The apparatus of claim 1 wherein the user interface comprises a display having an operational mode for presenting a plurality virtual waveform representations of audio signal streams oriented along a y-axis representing time.

9. The apparatus of claim 8 wherein the plurality virtual waveform representations of audio signal streams oriented along a y-axis representing time are each aligned with a column of controls usable to manipulate the corresponding audio signal stream.

10. A standalone disk jockey console apparatus comprising:
    a housing;

primary and secondary audio outputs on an exterior surface of the housing;

a user interface on an exterior surface of the housing and comprising a plurality of controllers;

a processor disposed within the housing and operatively coupled to the user interface and primary and secondary audio outputs and having an operational mode configured to:

simultaneously execute first and second virtual player processes each of which is capable of generating a first and a second audio program, respectively, and simultaneously execute first and second virtual mixer processes each of which is capable of converting the first and second audio programs, respectively, into first and second audio signal streams, respectively, the first audio signal stream being different from the second audio signal stream, wherein the first virtual mixer process is further capable of routing the first audio signal stream to one of the primary and secondary audio outputs in accordance with a configuration of the plurality of controllers of the user interface, and wherein the second virtual mixer process is further capable of simultaneously routing the second audio signal stream to the other of the primary and secondary audio outputs in accordance with the configuration of the plurality of controllers of the user interface, and wherein the first audio program and second audio program are generated simultaneously by the processor prior to conversion into the first audio signal stream and second audio stream, respectively, and prior to simultaneous routing to one of the primary and secondary audio outputs.

11. The apparatus of claim 10 further comprising a source of audio data and wherein one of the first and second audio programs is generated from the source of audio data.

12. The apparatus of claim 11 wherein both of the first and second audio programs are generated from the source of audio data.

13. The apparatus of claim 10 wherein the primary audio output is a master audio output of the apparatus.

14. The apparatus of claim 10 wherein the secondary audio output is a zone audio output of the apparatus.

15. A method for generating multiple audio streams with a standalone disk jockey console, the method comprising:

A) accessing a source of audio data;

B) generating, with a first virtual player process executing under control of a processor in a standalone disk jockey console, a first audio program from the source of audio data;

C) generating simultaneously, with a second virtual player process executing under control of the processor in the standalone disk jockey console, a second audio program different from the first audio program;

D) converting, under control of the processor in the standalone disk jockey console, the first and second audio programs into first and second audio signal streams, respectively, and E) routing, under control of the processor in the standalone disk jockey console, the first audio signal stream to a primary audio output of the standalone disk jockey console and simultaneously routing the second audio signal stream to a secondary audio output of the standalone disk jockey console.

* * * * *